United States Patent
Georges

[11] Patent Number: 5,524,785
[45] Date of Patent: Jun. 11, 1996

[54] SEALING PLUG FOR THREADED HOLES

[76] Inventor: Jean E. Georges, 645 NE 121st St., Apt. 304, Miami, Fla. 33161

[21] Appl. No.: 282,253

[22] Filed: Jul. 29, 1994

[51] Int. Cl.[6] .................................................. B65D 53/00
[52] U.S. Cl. ......................... 220/233; 138/96 T; 376/203
[58] Field of Search ................................ 215/358, 364, 215/356; 220/200, 288, 559, 233; 411/153, 262, 384, 371, 373, 917, 929; 52/302.7, 169.5; 42/1.06, 74; 89/44.01, 198; 376/203; 138/96 R, 96 T, 89

[56] References Cited

U.S. PATENT DOCUMENTS

| | | | |
|---|---|---|---|
| 782,349 | 2/1905 | Marshall | 411/262 |
| 815,172 | 3/1906 | Huffman | 215/358 |
| 1,971,830 | 8/1934 | Pailin | 220/233 |
| 2,400,318 | 5/1946 | Rosan | 411/373 |
| 2,679,192 | 5/1954 | Seeley et al. | 42/1.06 X |
| 2,802,401 | 8/1957 | Cabaniss et al. | 89/44.01 |
| 3,091,213 | 5/1963 | Maskell et al. | 138/43 |
| 3,353,566 | 11/1967 | Cepkauskas et al. | 138/89 X |
| 4,040,462 | 8/1977 | Hattan | 411/929.1 X |
| 4,948,550 | 8/1990 | Worthy | 138/89 |
| 5,217,676 | 9/1993 | Morandiere . | |
| 5,305,678 | 4/1994 | Talbot et al. | 42/1.06 X |

FOREIGN PATENT DOCUMENTS 2507439  9/1975  Germany .

*Primary Examiner*—Allan N. Shoap
*Assistant Examiner*—Robin A. Hylton
*Attorney, Agent, or Firm*—J. Sanchelima

[57] ABSTRACT

A device for preventing moisture, debris or other liquids from entering a hole adapted to receive a threaded member. The device comprises an interior plug having an external thread, an exterior plug having substantially the same diameter as the hole and suitably adapted such the top surface of the exterior plug is adapted to translate toward the interior plug when the threaded member is inserted into the hole. A resilient means, such as a spring, returning the exterior plug to a position such that its top surface is co-planar with the surface surrounding the hole when the threaded member is withdrawn from the hole.

5 Claims, 3 Drawing Sheets

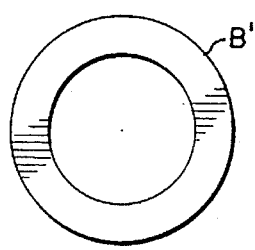
FIG - 4 -
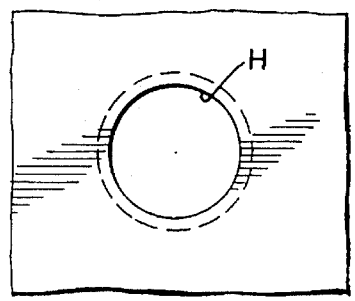
FIG - 6 -
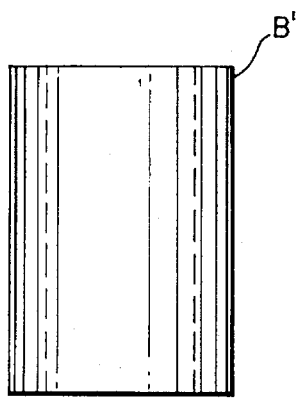
FIG - 4A
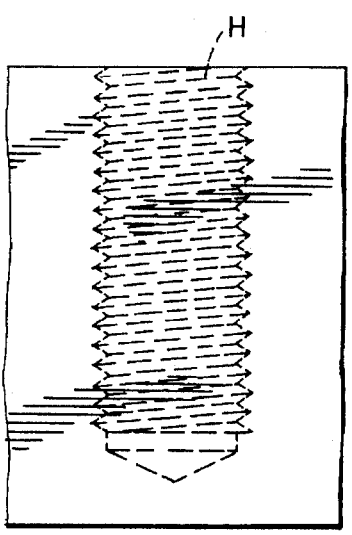
FIG - 6A -
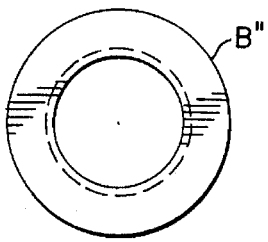
FIG - 5 -
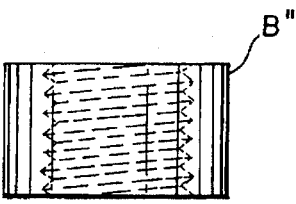
FIG - 5A -

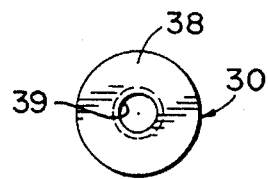
FIG. 7.
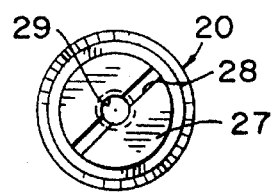
FIG. 9.
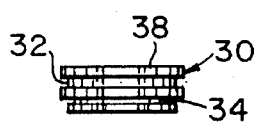
FIG. 7A.
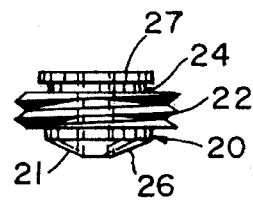
FIG. 9A.
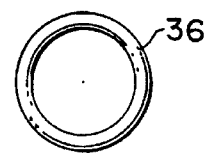
FIG. 10.
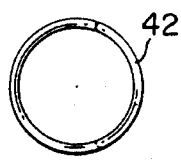
FIG. 8.
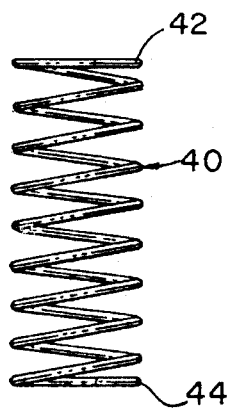
FIG. 8A.  FIG. 11.  FIG. 12.

SEALING PLUG FOR THREADED HOLES

BACKGROUND OF THE INVENTION

1. Field of the Invention

The present invention relates to sealing plugs for closing holes, and more particularly, to a device that a does not have to be removed in order for a screw, or plug, to utilize the hole. The hold closure device prevents most debris, water and extraneous particles from coming in.

2. Description of the Related Art

Applicant believes that the closest reference corresponds to U.S. Pat. No. 5,217,676 issued to Jean-Claude Morandiere on Jun. 8, 1993. However, it differs from the present invention because a user must remove the sealing plug in order to utilize the hole.

Other patents describing the closest subject matter provide for a number of more or less complicated features that fail to solve the problem in an efficient and economical way. None of these patents suggest the novel features of the present invention.

SUMMARY OF THE INVENTION

It is one of the primary objects of the present invention to provide a hole plug for threaded or unthreaded holes.

It is another object of the present invention to provide a hole plug that does not need to be removed in order to access the hole.

It is still another object of this invention to provide a hole plug that will prevent debris, moisture and other liquids from entering the hole.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 4 is a representation of a top view of the unthreaded bushing seen in FIG. 3.

FIG. 4A shows a side view of the unthreaded bushing seen in FIG. 4.

FIG. 5 illustrates an top view of the threaded bushing seen in FIG. 3.

FIG. 5A depicts a side view of the threaded bushing seen in FIG. 5.

FIG. 6 is a top view of a typical threaded hole.

FIG. 6A illustrates a side view of the threaded hole seen in FIG. 6.

FIG. 7 depicts a top view of the exterior plug of the present invention.

FIG. 7A shows a side view of the exterior plug seen in FIG. 7.

FIG. 8 illustrates a top view of the spring of the present invention.

FIG. 8A represents a side view of the spring seen in FIG. 8.

FIG. 9 is a top view of the interior plug of the present invention.

FIG. 9A illustrates a side view of the interior plug seen in FIG. 9.

FIG. 10 is a top view of the sealing ring of the present invention.

FIG. 10A depicts a side view of the sealing ring seen in FIG. 10.

FIG. 11 shows a spacer employed in FIG. 2.

FIG. 12 represents the small plug of the present invention.

DETAILED DESCRIPTION OF THE PREFERRED EMBODIMENT

Figure 1:
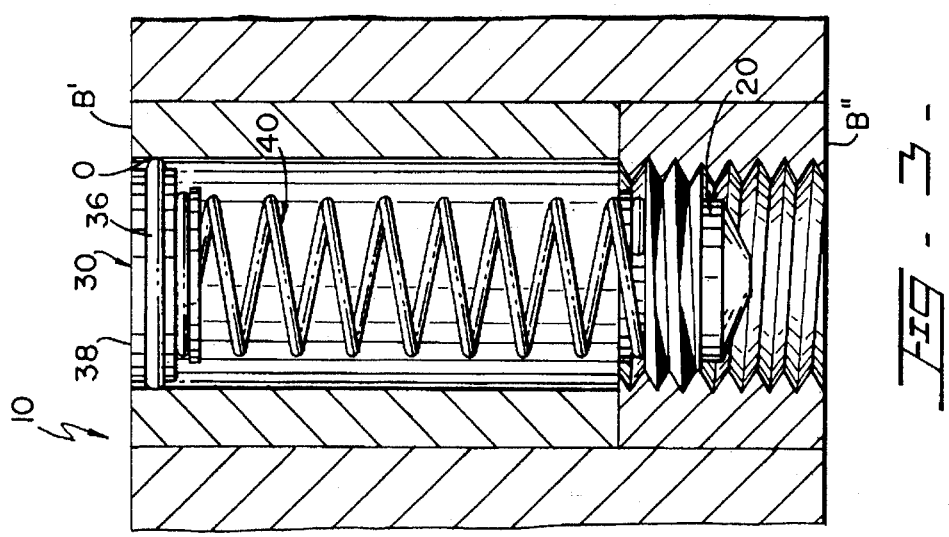
FIG. 1 represents a cross-sectional view of the present invention.

Referring now to the drawings, where the present invention is generally referred to with numeral 10, it can be observed that it basically includes interior plug 20, exterior plug 30 and spring 40.

Figure 2:
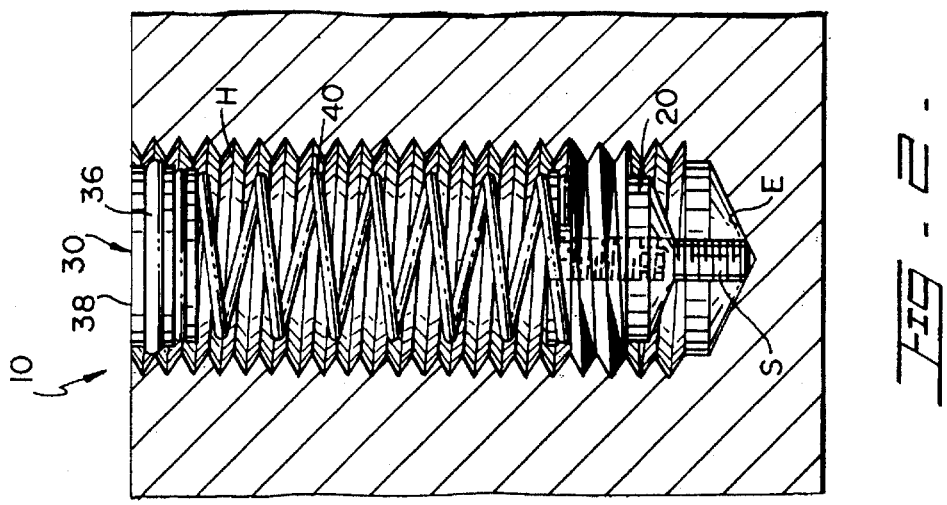
FIG. 2 shows a cross-sectional view of alternative embodiment of the present invention.
Figure 3:
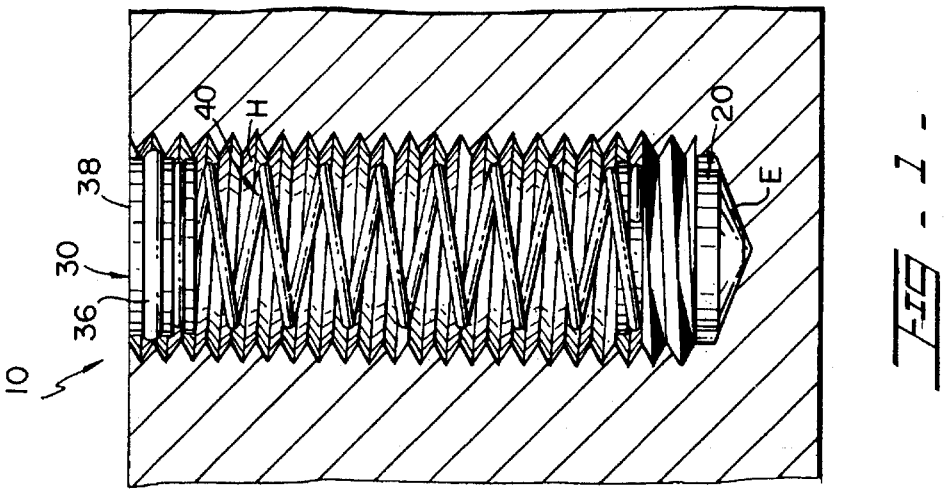
FIG. 3 illustrates a cross-sectional view of an alternative embodiment of the present invention employed in an unthreaded hole.

Referring now to FIGS. 1, 2 and 3, it can be seen that device 10 may be utilized to close a blind hole H or a non-blind hole O. Referring now to FIGS. 9 and 9A it can be seen that interior plug 20 comprises first end 21, threads 22, groove 24, head 26, second end 27, slot 28 and threaded bore 29. In the preferred embodiment threads 22 should have the same pitch as the thread of hole H. Also, the shape of head 26 corresponds to the seat E of blind hole H and cooperatively holds device 10 securely in hole H. In the preferred embodiment interior plug 20 has a slot 28 or Allen hole therethrough such that it may readily be installed in hole H using a screwdriver or Allen wrench. In an alternative embodiment, best seen in FIGS. 2 and 11, spacer S may be employed if hole H is substantially deeper than the length of device 10. In this alternative embodiment interior plug 20 has a spacer S, best seen in FIG. 11. Spacer S permits a user to utilize device 10 in a hole H that is deeper than the length of device 10. Spacer S passes through threaded bore 29, of interior plug 20, and together with interior plug 20 cooperatively eliminate undesired motion of device 10 that may permit liquid or unwanted debris from entering hole H. In order to prevent undesired relative motion between the spacer S and interior plug 20 each of these elements should have opposing threads. For example, if interior plug 20 has a thread 22 that is a right-handed thread it is desirable for spacer S to have a left-handed thread thereon its exterior surface.

Referring now to FIGS. 8 and 8A, it can be seen that spring 40 has first end 42 and second end 44. Referring also to FIG. 1, it is apparent that second end 44, of spring 40, is snugly held by groove 24, of interior plug 20. It can also be seen in FIG. 1 that spring 40 has a diameter slightly smaller than that of hole H.

Referring now to FIGS. 7, 7A, 10 and 10A, it can be seen that exterior plug 30 comprises ring 32, groove 34, sealing ring 36, upper surface 38 and bore 39. First end 42, of spring 40, is snugly held by groove 34, of exterior plug 30, such that a user driving a screw, or other appropriate piece, into hole H will force exterior plug 30 towards interior plug 20. When the screw, or other appropriate piece, is removed spring 40 returns to its undeformed position and urges exterior plug 30 away from interior plug 20 such that upper surface 38, of exterior plug 30, is co-planar with the surface of the area surrounding hole H. In addition, as best seen from entering FIGS. 1, 2 and 3, sealing ring 36 snugly abuts the interior surface of hole H and presents a barrier to the entry of moisture, debris and other fluids into hole H, thereby contaminating or "dirtying" it. It is well known that a "dirty" hole increases the difficulty of driving a screw, or other appropriate piece, in to a hole and that it may also become corroded. Sealing ring 36 is best seen in FIGS. 10 and 10A. Also, as seen in FIGS. 7 and 7A, exterior plug 30 has a bore 39 therethrough. As seen in FIGS. 7 A and 12, in order to prevent debris or liquids from entering hole H, bore 39 is closed by small plug 35. A user that desires to remove device 10 from hole H, may remove small plug 35 and thereby access the slot 28 or Allen hole located therethrough interior plug 20 and remove interior plug 20. In an alternative embodiment, bore 39 may be threaded and small plug 35 may also be threaded to provide a less porous joint between the two.

Referring now to FIGS. 1, 2, 6 and 6A it can be seen that device 10 may be employed in a blind hole H best seen in FIGS. 6 and 6A.

Referring now to FIGS. 3, 4, 4 A, 5 and 5A, it is apparent that bushings B' and B" may be employed in a non-blind hole O. Referring specifically to FIG. 3, it can be seen that bushing B' and bushing B" cooperatively hold device 10 inside hole O and prevent moisture, debris or other undesired fluids from entering hole O. In addition, bushings B' and B" permit device 10 to be employed in an unthreaded hole.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A closure device for protecting a threaded hole by preventing debris and other extraneous bodies from entering said hole, comprising:

A) an internal plug member having a cooperative thread mating the thread of said hole and said internal plug member including two ends, and further including means for driving said internal plug member along said threaded hole; threaded hole;

B) a resilient member having first and second ends and said first end being mounted to one of the ends of said internal plug member and said resilient member being susceptible to a compression force applied by a user; and C) an external plug member having a diameter that is smaller that the diameter of said threaded hole and including two ends, and one of said ends being mounted to the second end of said resilient member, and said external plug member including a centrally disposed opening to permit access to said means for driving said internal plug member, so that said external plug member is positioned within said threaded hole to substantially prevent any extraneous objects from entering while simultaneously permitting said external plug member to move inwardly towards said internal plug member when a user overcomes the compression force of said resilient member.

2. The device set forth in claim 1 wherein said resilient member is a spring member.

3. The device set forth in claim 2 wherein said external plug member includes sealing means mounted peripherally thereon and of such diameter to come in slidable contact with the internal surface of said threaded hole.

4. The device set forth in claim 3 wherein said external plug member includes a plug member removably and cooperatively mounted to said centrally disposed opening.

5. The device set forth in claim 4 wherein said internal plug member includes a centrally disposed threaded through opening and further includes threaded elongated spacer means that cooperatively mates with said threaded through opening so that said spacer can reach the end of said threaded hole when the latter is longer than said device.

* * * * *